Patented Mar. 9, 1943

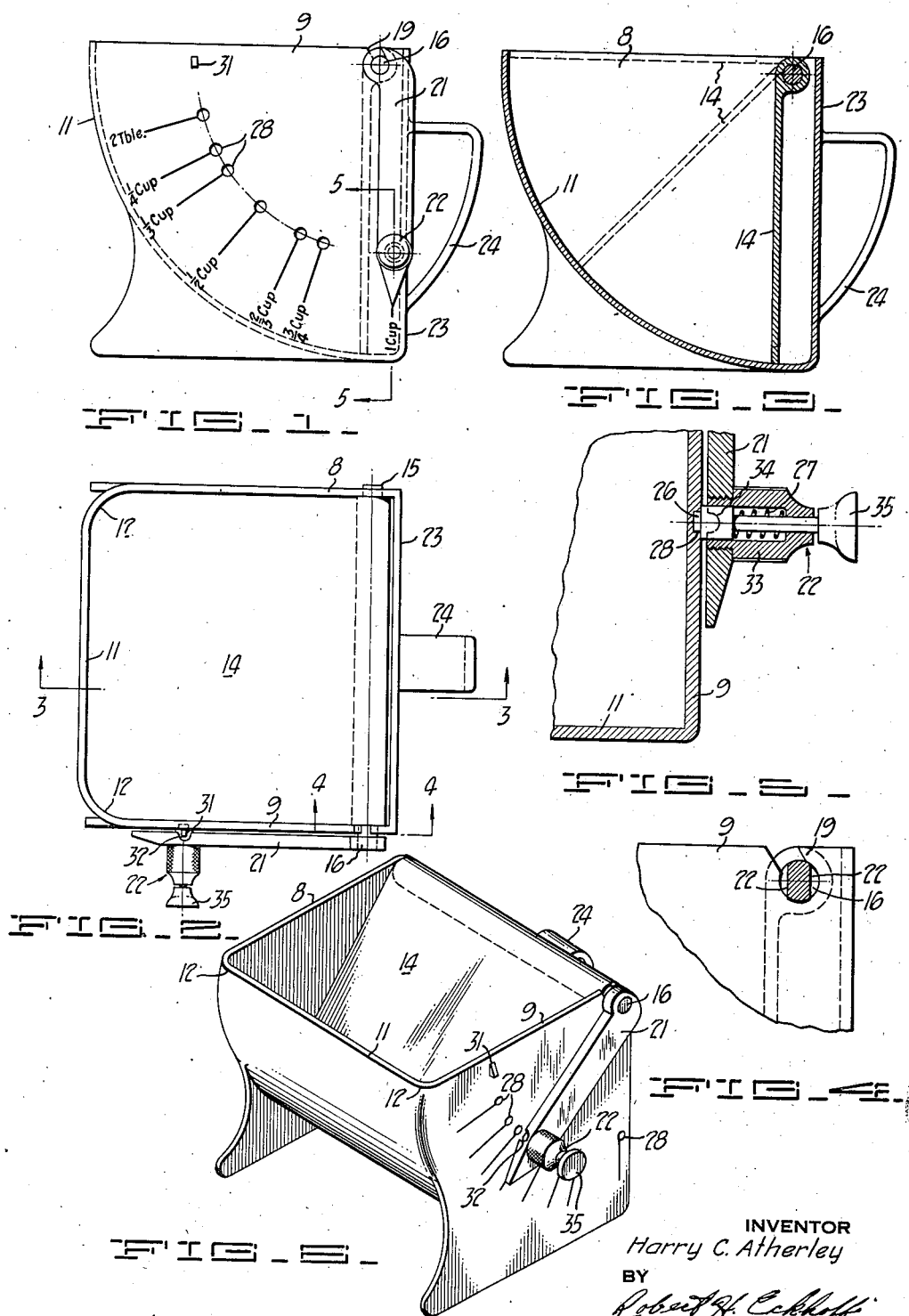

2,313,213

UNITED STATES PATENT OFFICE 2,313,213

MEASURING DEVICE

Harry C. Atherley, San Francisco, Calif.

Application December 13, 1939, Serial No. 309,045

4 Claims. (Cl. 73—165)

This invention relates to a measuring device, particularly one for use in a kitchen in measuring semi-solid materials such as shortening, butter, and the like. It will be appreciated that the measuring of semi-solid materials is relatively difficult. For example, if a recipe calls for a cup of shortening it is necessary to pack the shortening into a cup and then scrape it out of the cup. But the difficulty encountered in measuring out a cup of shortening is not to be compared with that when less than a cup is to be measured. In this instance the cup is filled with water to leave, as the unfilled portion, the measure desired. The solid is then added until the water rises to the cup lip. If too much is added some unknown quantity of water spills out and is lost. One must then guess as to the amount or start anew.

Attempts have been made to overcome these difficulties. One prior patentee has suggested a cup having an adjustable bottom to vary the capacity of the cup and, at the same time, to eject the material packed therein. While the thought behind this device is sound, measuring devices must be sold relatively cheaply and, if one attempts to make such a device out of plastic such shrinkage and size changes occur after manufacture that the slideable bottom will not function properly within the cylindrical shell. With the slideable bottom fitting snugly enough to retain a material, the bottom frequently jams.

The foregoing difficulties are either eliminated or otherwise overcome in the device of the present invention wherein I provide a measuring device which can be readily manipulated to any capacity desired and the contents, even though semi-solid, readily ejected. Further, the device can be cheaply manufactured. In fact, it can be constructed to compete successfully in the premium field.

It is in general the object of the present invention to provide a new and useful measuring device of the class described, which is particularly further characterized by simplicity, ease, reliability and accuracy in operation and low cost of manufacture.

The invention includes other objects and features of advantage, some of which, together with the foregoing, will appear hereinafter, wherein the present preferred form of measuring device of this invention is disclosed.

In the drawing accompanying and forming a part hereof, Figure 1 is a side elevation of the completed device of the present invention.

Figure 2 is a plan view of the device of the present invention. Figures 3 and 4 are respectively cross sectional views taken along the lines 3—3 and 4—4 of Figure 2.

Figure 5 is a fractional view showing the cross section through the handle, along the line 5—5 of Figure 1.

Figure 6 is a perspective of the complete measuring device.

The device of the present invention is made up of two arcuately or sector-shaped end portions 8 and 9. Along one side of the arcuate or sector-shaped end portions is mounted a cylindrically shaped member 11. If desired, the end portions and the cylindrically shaped member can be pressed, molded or otherwise fabricated in one piece, with the junction of the end portions and the cylindrically shaped member rounded off as at 12 so that sharp corners are absent and the removal of material from the device is facilitated.

In accordance with this invention, I provide a flat vane member 14. This member is mounted for a rotational movement between the end portions and over substantially the entire extent of the cylindrically shaped member into a plurality of selected positions to provide a bottom for a receptacle formed by the vane member with the end portions and the cylindrically shaped member. The vane member is so mounted and provided that it fits snugly against both end portions of the cylindrically shaped member and is flush with the top. A gasket can be placed on the vane if desirable.

The mounting of the vane member can take various forms, but I have provided a stub shaft 15 fitting within a suitable bearing in end portion 8 and another stub shaft 16 fitting within a slotted bearing 19 on end portion 9. Stub shaft 16 extends beyond the end portion and on this I mount a suitable lever 21 to manipulate the vane and alter its position. Stub shafts 15 and 16 can be one shaft.

A handle 22 is attached to the lever means 21 and carries a latch 26 therein biased by a spring 27 to engage any one of the plurality of indentations 28 in end portion 9. These indentations are provided at the various selected and indicated positions corresponding to different cup capacities.

A stop 31 is provided adjacent the edge of the receptacle. This is engaged by latch 26, slot 32 in the lever 21 passing the stop which engages the latch. The handle 22 is made up of a base 33 in which the latch 26 is slideable, the base being slotted as at 34 to pass the stop. The latch 26 carries a knob 35 to permit the latch to be manipulated.

Referring particularly to Figure 4, it is to be noted that shaft 16 includes a flat portion 22 thereon. This enables the vane member to be withdrawn from the device when moved into a raised position wherein the flat 22 on shaft 16 will permit it to pass slotted bearing 19 so that cleaning of the device is facilitated. To permit this removal of the vane, knob 35 is pulled outward sufficiently to allow latch 26 to move over stop 31. The latter then passes freely through slots 32 and 34 in the lever 21 and base 33 of handle 22. If desired, a back 23 can be provided on the end members and a handle 24 mounted thereon to facilitate handling of the device. However, the back is not necessary and can be omitted if desired.

In operation, the knob 35 is pulled away from the base 33 and lever 21 is moved into a desired position. Thereupon, the material to be measured, either semi-solid, liquid, or powder, is placed in the receptacle formed between the end portions, the cylindrically shaped member, and the positioned vane. The material is leveled off to the level of end portions 8 and 9. The material is then ejected by raising the lever until it engages the stop 31. In this position the vane is flush with the edge of the cup or receptacle. A knife or other straight edge is then passed across the vane and any material thereon removed.

I claim:

1. A measuring device comprising means defining a commodity receptacle, including a substantially flat vane member fitting in said receptacle in a commodity retaining relationship during rotational movement of said vane member in said receptacle into a plurality of selected positions in which said vane member provides one side of said receptacle, shaft means positioned at one end of said vane member for supporting said vane member for said rotational movement in said receptacle from a discharge position in which said flat vane member is substantially coplanar with the lip of said receptacle, a lever on said shaft means for rotating said vane member selectively, said lever being positioned on the outside of said receptacle, and cooperating latching means carried by said lever and said receptacle for retaining said lever in a selected position.

2. A measuring device comprising means defining a commodity receptacle, including a substantially flat vane member fitting in said receptacle in a commodity retaining relationship during rotational movement of said vane member in said receptacle into a plurality of selected positions in which said vane member provides one side of said receptacle, shaft means positioned at one end of said vane member for supporting said vane member for said rotational movement in said receptacle from a discharge position in which said flat vane member is substantially coplanar with the lip of said receptacle, a lever on said shaft means for rotating said vane member selectively, said lever being positioned on the outside of said receptacle, cooperating latching means carried by said lever and said receptacle for retaining said lever in a selected position, a stop for limiting movement of said lever when said vane member is in said discharge position, and means for moving said latching means on said lever to permit movement of said lever beyond said stop.

3. A measuring device comprising means defining a commodity receptacle, including a substantially flat vane member fitting in said receptacle in a commodity retaining relationship during rotational movement of said vane member in said receptacle into a plurality of selected positions in which said vane member provides one side of said receptacle, shaft means positioned at one end of said vane member for supporting said vane member for said rotational movement in said receptacle from a discharge position in which said flat vane member is substantially coplanar with the lip of said receptacle, bearing means carried by said receptacle, one of said bearings being slotted and cooperating with said shaft means for removal of said vane member from said receptacle, a lever on said shaft means for rotating said vane member selectively, said lever being positioned on the outside of said receptacle, and cooperating latching means carried by said lever and said receptacle for retaining said lever in a selected position.

4. A measuring device comprising means defining a commodity receptacle, including a substantially flat vane member fitting in said receptacle in a commodity retaining relationship during rotational movement of said vane member in said receptacle into a plurality of selected positions in which said vane member provides one side of said receptacle, shaft means positioned at one end of said vane member for supporting said vane member for said rotational movement in said receptacle from a discharge position in which said flat vane member is substantially coplanar with the lip of said receptacle, bearing means carried by said receptacle, one of said bearings being slotted and cooperating with said shaft means for removal of said vane member from said receptacle, a lever on said shaft means for rotating said vane member selectively, said lever being positioned on the outside of said receptacle, cooperating latching means carried by said lever and said receptacle for retaining said lever in a selected position, a stop for limiting movement of said lever when said vane member is in said discharge position, and means for moving said latching means on said lever to permit movement of said lever beyond said stop for removal of said vane member from said receptacle.

HARRY C. ATHERLEY.